(12) United States Patent
Hanif

(10) Patent No.: US 8,319,608 B2
(45) Date of Patent: Nov. 27, 2012

(54) APPARATUS AND METHOD FOR CONTROLLING ELECTRONIC DEVICE

(75) Inventor: Sadeque Hanif, Tokyo (JP)

(73) Assignee: Freescale Semiconductor, Inc., Austin, TX (US)

( * ) Notice: Subject to any disclaimer, the term of this patent is extended or adjusted under 35 U.S.C. 154(b) by 668 days.

(21) Appl. No.: 12/535,686

(22) Filed: Aug. 5, 2009

(65) Prior Publication Data

US 2010/0112945 A1    May 6, 2010

(30) Foreign Application Priority Data

Nov. 5, 2008   (JP) ................. 2008-284780

(51) Int. Cl.
*G08B 5/22* (2006.01)
(52) U.S. Cl. .................. 340/7.27; 455/422.1
(58) Field of Classification Search ............ 340/12.22, 340/7.33, 7.27, 5.1, 4.11; 725/25; 455/419, 455/456.4, 422.1
See application file for complete search history.

(56) References Cited

U.S. PATENT DOCUMENTS

| | | | |
|---|---|---|---|
| 5,870,453 A | * | 2/1999 | Shapiro ..................... 379/38 |
| 2002/0029382 A1 | * | 3/2002 | Deniau et al. ............... 725/25 |
| 2005/0289584 A1 | * | 12/2005 | Kozlowski et al. .......... 725/25 |
| 2006/0128419 A1 | | 6/2006 | Shimizu et al. |
| 2008/0273719 A1 | * | 11/2008 | Chen ......................... 381/107 |

FOREIGN PATENT DOCUMENTS

| | | |
|---|---|---|
| JP | 6037563 A | 2/1994 |
| JP | 10322153 A | 12/1998 |
| JP | 11346396 A | 12/1999 |
| JP | 2002363341 A | 12/2002 |
| JP | 2004056298 A | 2/2004 |
| JP | 2004345477 A | 12/2004 |

* cited by examiner

*Primary Examiner* — Vernal Brown
(74) *Attorney, Agent, or Firm* — Charles Bergere (57) ABSTRACT

An electronic control device transmits a function control signal within a predetermined area. Other electronic devices within the predetermined area receive the function control signal. The function control signal initiates a control program in an electronic device in the predetermined area that adjusts one or more user setting conditions of the electronic device, such as audio volume level, display brightness level, etc. The original user setting conditions are returned to their prior values when the device exits the predetermined area or otherwise stops receiving the function control signal.

16 Claims, 7 Drawing Sheets

APPARATUS AND METHOD FOR CONTROLLING ELECTRONIC DEVICE

BACKGROUND OF THE INVENTION

The present invention relates to an electronic device having a wireless communication function, a method for controlling an electronic device, a program for controlling the electronic device, and a control device for an electronic device.

There are electronic devices having various types of functions that are set by a user. However, there are situations depending on the location and time in which the usage of an electronic device should be restricted or the control of an electronic device is desired. Therefore, research on technology for automatically adjusting the setting conditions of an electronic device has been carried out (refer, for example, to patent documents 1 to 6 listed below).

Patent document 1 describes a technique for generating a warning sound with a volume that corresponds to the volume of the noise around a vehicle. Patent document 2 describes a technique for setting the volume for when an on-timer function of a video/acoustic equipment is turned ON and for setting the volume to a different level immediately after an off-timer turns OFF the power. Patent document 3 describes a technique for automatically adjusting the volume of an audio system in accordance with the speed of an automobile. Patent document 4 describes a technique of automatically lowering the volume of an audio system if the window or door opens when the automobile is not moving and automatically increasing the volume of the audio system when the window or door is closed. Patent documents 5 and 6 describe techniques for adjusting the volume when changing television channels or when a commercial broadcast switches to a program broadcast.

In patent documents 1 to 6, the electronic device performs automatic adjustments by itself. However, there are situations in which it is desirable that an electronic device be externally controlled in accordance with the ambient environment of the electronic device. For instance, there are cases in which it is desirable that communication with a mobile phone be prohibited in a communication prohibition area or the like. Accordingly, research on a technique for shifting a phone unit to a sleep state upon receipt of communication prohibition information in such an area has been carried out (see e.g., patent document 7).

In patent document 7, when receiving communication prohibition information from a BT device arranged in the communication prohibition area, the mobile phone transmits a message-recording mode registration request signal and enters a sleep state, in which electrical signals are not emitted. The mobile phone returns to a state in which signals are transmittable when moved out of the communication prohibition area.

[Patent document 1] Japanese Laid-Open Patent Publication No. 2004-345477 (P. 1)
[Patent document 2] Japanese Laid-Open Patent Publication No. 2004-56298 (P. 1)
[Patent document 3] Japanese Laid-Open Patent Publication No. 2002-362241 (P. 1)
[Patent document 4] Japanese Laid-Open Patent Publication No. 10-322153 (P. 1)
[Patent document 5] Japanese Laid-Open Patent Publication No. 06-37563 (P. 1)
[Patent document 6] Japanese Laid-Open Patent Publication No. 11-346396 (P. 1)
[Patent document 7] Japanese Laid-Open Patent Publication No. 2003-179683 (P. 1)

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

There is a need for forcibly changing the setting condition (setting value, operation state, etc.) set by a manager in a specific area, as described above. In particular, patent document 7 controls the prohibition of communication or telephone calls of a mobile phone. There are also cases in which it is desirable that flash photography and volume be restricted depending on the situation, such as location and time. In the prior art, such restrictions are often carried out by either audibly or via a sign, requesting a user to manually change the settings of the device. However, a user may not notice or ignore such a request. With such electronic devices, the setting value and operation state differs depending on the user, and restrictions must be imposed in view of the setting state of each user. Patent document 7 does not describe any process that takes into consideration the state set by the user.

The present invention provides an electronic device having a wireless communication function, a method for controlling an electronic device, a program for controlling an electronic device, and a control device for an electronic device that limits undesirable operations of the electronic device while the electronic device is in a predefined area.

One aspect of the present invention is an electronic device including a control means for executing a control process for implementing a function. A function changing means changes a setting condition in accordance with an operation performed by a user when the function is implemented and holds the set setting condition. A wireless reception means receives a function control signal containing a function type specification, which specifies a function of a control subject, and a control message, which is related to a setting condition for controlling the function of the control subject. The control means includes a control determining means for, when receiving the function control signal from a controller that includes a wireless signal transmission means for transmitting the function control signal to a control target area covering a predetermined range, determining whether or not the setting condition for the function of the control subject that is specified by the function type specification in the function control signal corresponds with the setting condition of the control message in the function control signal. A function control means sends a changing instruction to the function changing means to change the setting condition in accordance with the control message when the setting condition for the function of the control subject does not correspond with the setting condition of the control message.

Another aspect of the present invention is a method for controlling an electronic device including a control means for executing a control process for implementing a function. A function changing means changes a setting condition in accordance with an operation performed by a user when the function is implemented and holds the set setting condition. A wireless reception means receives a function control signal containing a function type specification, which specifies a function of a control subject, and a control message, which is related to a setting condition for controlling the function of the control subject. The method includes a control determining step, which is performed by the control means, of, when receiving the function control signal from a controller that includes a wireless signal transmission means for transmitting the function control signal to a control target area covering a predetermined range, determining whether or not the setting condition for the function of the control subject that is specified by the function type specification in the function control signal corresponds with the setting condition of the control message in the function control signal. The method further includes a function control step, which is performed by the control means, of sending a changing instruction to the function changing means to change the setting condition in accordance with the control message when the setting condition for the function of the control subject does not correspond with the setting condition of the control message.

A further aspect of the present invention is a program for controlling an electronic device including a control means for executing a control process for implementing a function. A function changing means changes a setting condition in accordance with an operation performed by a user when the function is implemented and holds the set setting condition. A wireless reception means receives a function control signal containing a function type specification, which specifies a function of a control subject, and a control message, which is related to a setting condition for controlling the function of the control subject. The program includes having the control means function as a control determining means for, when receiving the function control signal from a controller that includes a wireless signal transmission means for transmitting the function control signal to a control target area covering a predetermined range, determining whether or not the setting condition for the function of the control subject that is specified by the function type specification in the function control signal corresponds with the setting condition of the control message in the function control signal. The program also includes having the control means function as a function control means for sending a changing instruction to the function changing means to change the setting condition in accordance with the control message when the setting condition for the function of the control subject does not correspond with the setting condition of the control message.

Still another aspect of the present invention is a controller for controlling an electronic device. The controller includes a wireless signal transmission means for transmitting a control signal for controlling the electronic device to a control target area covering a predetermined range. A control means instructs transmission of the control signal. A trigger means provides a trigger signal to the control means. The control means includes a means for instructing transmission of a function control signal from the wireless signal transmissions means. The function control signal contains a function type specification, which specifies a function of a control subject in the electronic device, and a control message, which is related to a setting condition for controlling the function of the control subject.

Other aspects and advantages of the present invention will become apparent from the following description, taken in conjunction with the accompanying drawings, illustrating by way of example the principles of the invention.

Figure 1:
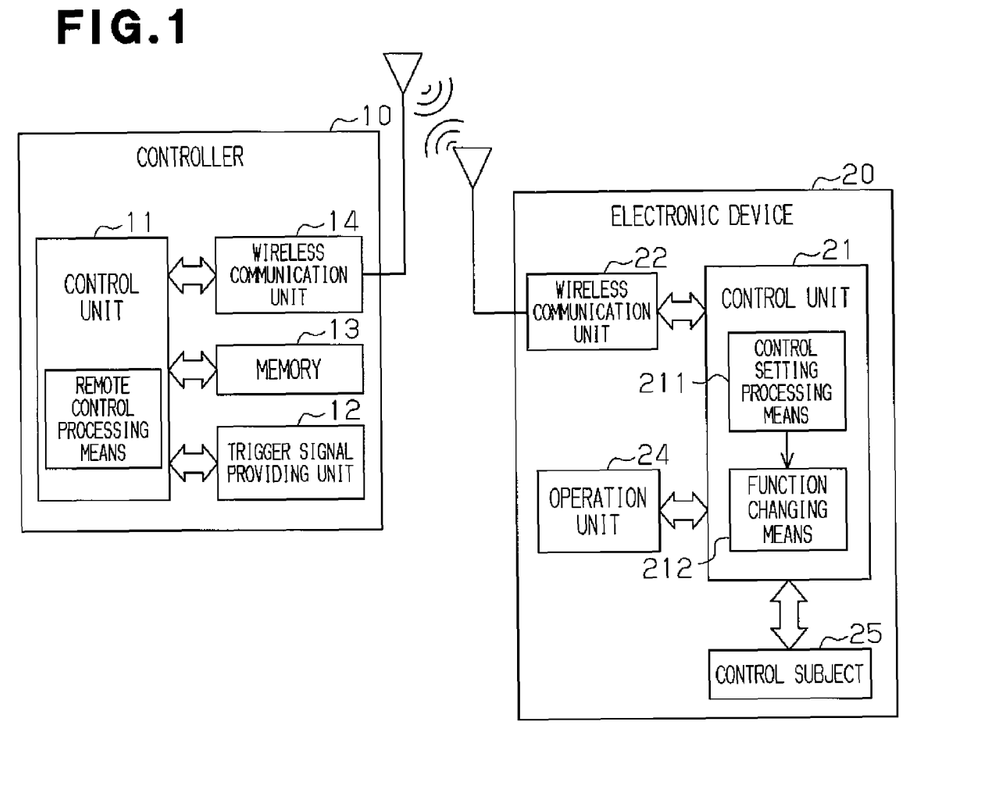
FIG. 1 is a block diagram showing the structure of a controller and an electronic device in an embodiment of the present invention.
Figure 2:
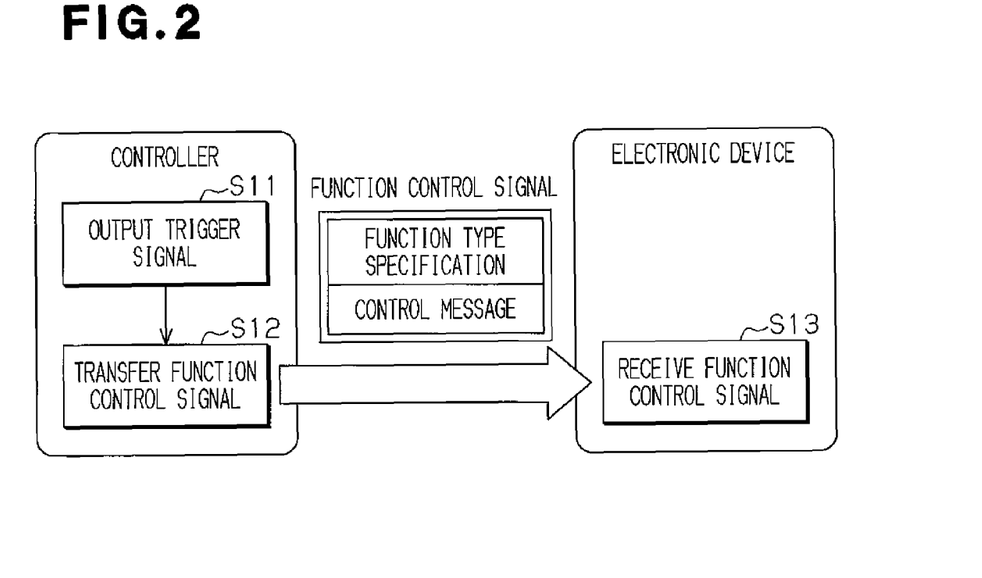
FIG. 2 is a flowchart showing a process for transmitting and receiving a function control signal in accordance with the present invention.

Embodiments of the present invention will now be discussed with reference to FIGS. 1 to 8. In the present invention, a wireless control system includes a controller 10 and an electronic device 20 as shown in FIG. 1. The controller 10 controls the electronic device 20 by transmitting a function control signal to the electronic device. As shown in FIG. 2, the function control signal contains data that relates to a function type specification, which specifies the function of a control subject, and a control message, which relates to the setting conditions for controlling the function.

The structure of the controller 10 will first be discussed.

As shown in FIG. 1, the controller 10 includes a control unit 11, a trigger signal providing unit 12, a memory 13, and a wireless communication unit 14. The control unit 11 functions as a control means of the controller, the trigger signal providing unit 12 functions as a trigger means, and the wireless communication unit 14 functions as a wireless signal transmission means.

The control unit 11, which includes a CPU, RAM, ROM etc. (not shown), performs a process (process including remote control processing stage, etc.) described later. The control unit 11 executes a remote control processing program, and functions as a remote control processing means. Specifically, when receiving a signal from the trigger signal providing unit 12 in accordance with the remote control processing program, the control unit 11 generates a function control signal using the data stored in the memory 13. Then, the control unit 11 transmits the function control signal out of the controller 10 with the wireless communication unit 14.

The trigger signal providing unit 12 of FIG. 1 provides a trigger signal to the control unit 11. The trigger signal is output upon determination of a situation, which satisfies a condition that triggers the generation of a control signal. For example, when an incoming call detection means functions as the trigger signal providing unit 12, the trigger signal providing unit 12 generates a function control signal when detecting an incoming call. In this case, the incoming call detection means provides the control unit 11 with the function control signal. When a time detection means functions as trigger signal providing unit 12, the trigger signal providing unit 12 generates a function control signal during a predetermined signal generation time period. In this case, the time detection means, which has detected that the present time is within the signal generation time period, provides the control unit 11 with the trigger signal.

The memory 13 stores the data related to the function type specification and the control message.

The wireless communication unit 14, which includes an antenna, transmits the function control signal via the antenna. In the preferred embodiment, the wireless communication unit 14 transmits the function control signal using short-range wireless technology such as infrared light, ZIGBEE (registered trademark), and Bluetooth (registered trademark). The wireless communication unit 14 transmits radio waves having an intensity that corresponds to the size of a predetermined control target area. The controller 10 thus transmits the function control signal to the electronic device 20 positioned within the control target area, which is in accordance with the signal intensity of the wireless electric waves.

The electronic device 20, which receives the function control signal transmitted by the controller 10, includes a control unit 21, a wireless communication unit 22, an operation unit 24, and a control subject 25. The control unit 21 functions as a control means and a function changing means of the electronic device 20, and the wireless communication unit 22 functions as a wireless reception means.

The control unit 21, which includes a CPU, RAM, ROM, etc. (not shown), performs a process (process including control determining stage and function controlling stage), which will be described later. The control unit 21 executes a control program and functions as a control setting processing means 211 and a function changing means 212.

The control setting processing means 211, which functions as a control determining means and a function control means, specifies the function that should be the control subject from the function type specification data of the function control signal acquired by the wireless communication unit 22. The control setting processing means 211 performs a process for changing the setting condition specified by the control message in the function control signal. In this case, the control setting processing means 211 temporarily stores a current setting value (user setting value) prior to the change in an associated memory, which serves as a user setting state storage means. The electronic device 20 is reset with the user setting value upon completion of the receipt of the function control signal. Completion of the function control signal can be either the electronic device 20 no longer receiving the function control signal, for example, if the electronic device has moved outside of the signal range of the controller 10 or if the controller 10 stops broadcasting the function control signal.

The function changing means changes the setting condition of the control subject 25 in response to a setting instruction from the operation unit 24 or a setting instruction from the control setting processing means 211. The function changing means stores the present setting condition subsequent to the change in the incorporated memory.

The wireless communication unit 22, which includes an antenna, receives the function control signal with the antenna and provides the function control signal to the control unit 21.

The operation unit 24 executes a process for accepting the setting condition changing instruction from the user.

The control subject 25 has a setting condition that is changed by the function changing means of the control unit 21. For example, when the volume is set as the control subject by the function control signal, a volume adjustment unit of a speaker or earphone functions as the control subject 25.

The processes performed by the controller 10 and the electronic device 20 will now be discussed with reference to FIGS. 2 and 3.

Referring to FIG. 2, the control unit 11 of the controller 10 executes a process for outputting the trigger signal (step S11). Specifically, when detecting a time or situation that forms a trigger, the trigger signal providing unit 12 generates a trigger signal and provides the trigger signal to the control unit 11.

The control unit 11, which receives the trigger signal, transmits a function control signal (step S12). Specifically, the remote control processing means of the control unit 11 acquires the function type specification data and the control message from the memory 13, generates the function control signal, and transmits the function control signal from the wireless communication unit 14. In this case, the electronic device 20, which is in the control target area, receives the function control signal (step S13).

The control process performed in the electronic device 20 will be described using FIG. 3.

The electronic device 20 executes a process for determining whether or not the function control signal has been received (step S21). If the function control signal is received from the controller 10 ("YES" in step S21) in the same manner as in step S13, the control unit 21 of the electronic device 20 executes a process for determining whether or not the present setting condition corresponds with the setting condition of the control message (step S22). Specifically, the control unit 21 specifies the function that is to be controlled based on function type specification data in the function control signal. The control unit 21 compares the present or current user setting condition of the specified function and the setting condition of the control message in the function control signal.

If the comparison result indicates that the present setting condition does not correspond with the setting condition of the control message ("NO" in step S22), the control unit 21 executes a process for storing the user setting value (step S23). Specifically, the control setting processing means 211 of the control unit 21 temporarily stores the current user setting condition in a memory of the electronic device 20.

Then, the control unit 21 of the electronic device 20 executes a changing process using the setting condition of the control message (step S24). Specifically, the control setting processing means 211 of the control unit 21 changes the setting condition of the control subject 25 so that it corresponds with the setting condition specified in the control message. In this case, when the setting condition of the control message is within a tolerable range, the control setting processing means 211 changes the setting condition to a setting condition that is closest to the user setting value within the tolerable range.

The control unit 21 of the electronic device 20 then executes a process for determining whether or not the setting condition has been manually changed (step S25).

If the setting condition has not been manually changed ("NO" in step S25), a process for determining whether or not the receipt of the function control signal has been completed is executed (step S26).

If receipt of the function control signal has not been completed ("NO" in step S26) then prior step S25 is repeated until the setting condition has been changed or the receipt of the function control signal is completed.

When the user operates the operation unit 24 of the electronic device 20 to change the setting condition of a function, the operation unit 24 provides setting changing instruction data to the control unit 21. The control unit 21 then detects the setting changing instruction and determines that the setting condition has been manually changed. In this case ("YES" in step S25), the control unit 21 repeatedly executes the processes subsequent to step S21.

If the changed setting condition corresponds with the setting condition in the control message ("YES" in step S22), the control unit 21 returns to step S21 and repeats steps S21 and S22 waits until a different function control signal is received.

If the manually changed setting condition does not correspond with the setting condition of the control message ("NO" in step S22), then the changed setting condition is stored as the user setting value (step S23), and the setting condition is changed to the setting condition of the control message (step S24). The control unit 21 waits until the setting condition is manually changed ("YES" in step S25) or receipt of the function control signal is completed ("YES" in step S26).

If receipt of the function control signal has completed without the setting condition being manually changed ("YES" in step S26), the control unit 21 of the electronic device 20 executes a process for recovering the user setting value (step S27). Specifically, the control setting processing means 211 of the control unit 21 changes the setting condition of the control subject 25 to the previously stored user setting value. The control unit 21 of the electronic device 20 then returns to step S21, and waits until receiving a different function control signal.

The preferred embodiment has the advantages described below.

(1) In the preferred embodiment, the trigger signal providing unit 12 generates the trigger signal and provides the trigger signal to the control unit 11 when a time, situation, or the like that forms a trigger is detected in the controller 10. The control unit 11 then generates and transmits the function control signal containing the function type specification data and the control message (step S12). When receiving the function control signal (step S21), the electronic device 20 when located in the control target area executes a process for determining whether or not the present setting condition corresponds with the setting condition of the control message (step S22). If the present setting condition does not correspond with the setting condition of the control message ("NO" in step S22), the electronic device 20 executes the changing process using the setting condition of the control message (step S24). Thus, when a predetermined time, situation, or the like is detected, the controller 10 forcibly changes the setting condition of the electronic device 20 that is located in the control target area to the setting condition of the corresponding control message.

(2) When executing the changing process with the setting condition of the control message (step S24), if the setting condition of the control message has a tolerable range, the control unit 21 of the electronic device 20 changes the setting condition to the setting condition that is closest to the user setting value in the tolerable range. Thus, in the setting conditions of the control message, the setting condition is changed to the setting condition that is closest to the setting condition set by the user.

(3) If the present setting condition does not correspond with the setting condition of the control message ("NO" in step S22), the control unit 21 of the electronic device 20 executes the process for storing the user setting value (step S23). Then, if receipt of the function control signal is completed ("YES" in step S26) without the setting condition being manually changed, the control unit 21 of the electronic device 20 executes a process for recovering the user setting value (step S27). Thus, the electronic device 20, which has completed receipt of the function control signal, automatically returns the setting value to the user setting value set by the user. This provides user convenience.

(4) When the user operates the operation unit 24 of the electronic device 20, the control unit 21 of the electronic device 20 detects the setting changing instruction from the operation unit 24 and determines that the setting condition has been manually changed. In this case ("YES" in step S25), the control unit 21 repeatedly executes the processes subsequent to step S21. Thus, even if the user operates the operation unit 24 to change the setting condition, priority is given to the control executed by the controller 10 when the function control signal is received. Accordingly, the setting condition of the electronic device 20 in the control target area is forced to remain in the same state.

Examples embodying the controller 10 and the electronic device 20 will now be discussed.

A first example in which a control is executed to reduce the volume of a television when an incoming call is received by a home telephone will now be discussed with reference to FIG. 4. The home telephone functions as the controller 10, and the television functions as the electronic device 20. The television is arranged at a location where a volume restriction control signal serving as the function control signal is receivable from the home telephone.

In the home telephone, an incoming call detection means for detecting the incoming call of the telephone call functions as the trigger signal providing unit 12. The home telephone transmits the volume restriction control signal serving as the function control signal. The memory 13 of the home telephone stores the function type specification data, which specifies the sound output function, and the control message of the setting condition (volume level) for the sound output function. A volume level that is tolerated as the volume of the television when an incoming call is received (e.g., noise level≦maximum tolerable value X) is used as the setting condition of the sound output function.

The control subject 25 of the television is a sound output unit for outputting sound from the television. The operation unit 24 of the television is a volume adjustment unit for adjusting the volume. The function changing means of the control unit 21 of the television holds the present setting condition (volume level) set by the user for the sound output function, and sound is output in accordance with such condition. Upon receipt of the volume restriction control signal, the control unit 21 specifies the sound output function as the control target from the function type specification of the volume restriction control signal. Then, the control unit 21 executes the processes of steps S21 to S27 to control the sound (volume control).

The process for controlling the volume of the television with the home telephone will now be discussed.

Figure 4:
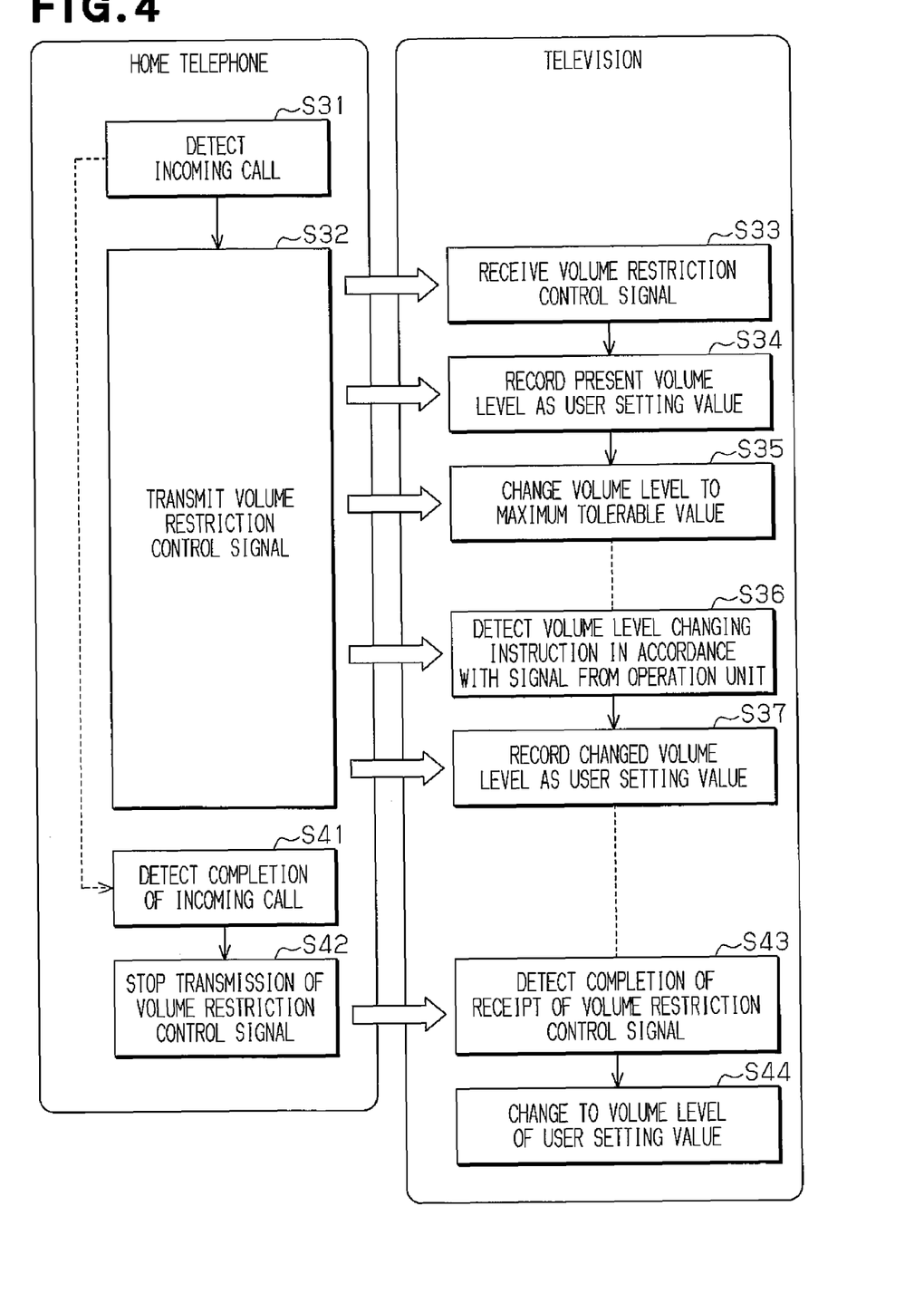
FIG. 4 is a flowchart showing the main parts of a process in a first example in accordance with the present invention.

Referring to FIG. 4, the control unit 11 of the home telephone detects an incoming call (step S31). Specifically, when an incoming call is received, the incoming call detection means of the home telephone detects the incoming call and provides the trigger signal to the control unit 11 (step S11 of FIG. 2).

The control unit 11 of the home telephone then executes a process for transmitting the volume restriction control signal (step S32). Specifically, the remote control processing means of the control unit 11 acquires the function type specification data and the control message stored in the memory 13, generates the volume restriction control signal, and transmits the volume restriction control signal out of the controller 10 from the wireless communication unit 14 (step S12 of FIG. 2).

Figure 3:
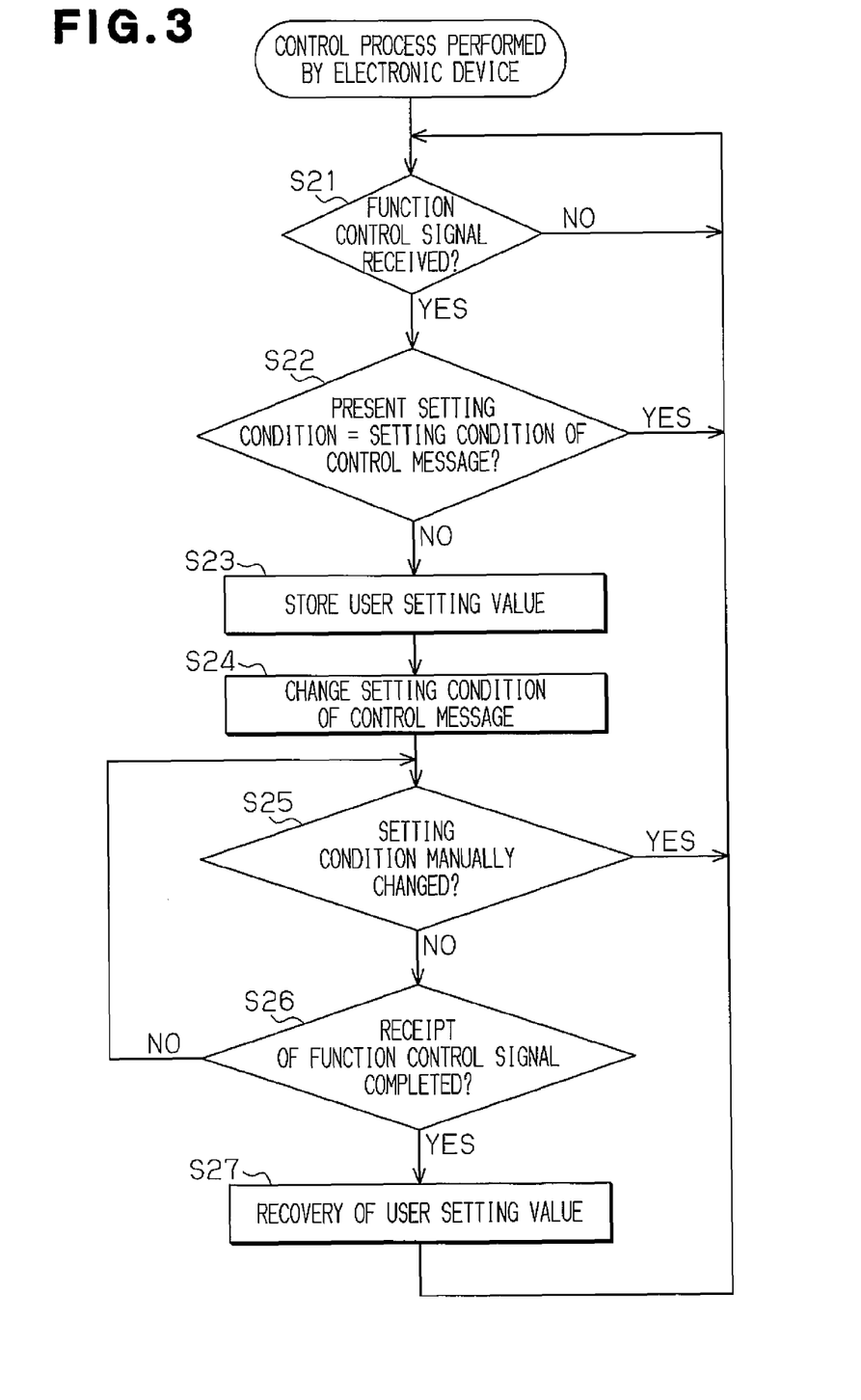
FIG. 3 is a flowchart showing a control process for the electronic device in accordance with the present invention.

In this case, the television located in the control target area receives the volume restriction control signal (step S33, step S13 in FIG. 2, and "YES" in step S21 of FIG. 3). The control unit 21 of the television specifies the sound output function as the function that is to be controlled from the function type specification in the volume restriction control signal. The control unit 21 also specifies the present setting condition (volume level) of the sound output function.

The control unit 21 of the television executes the control process by the function restriction signal. In this case, whether or not the present setting condition corresponds with the setting condition of the volume in the volume restriction control signal is determined (step S22 of FIG. 3). Specifically, the control unit 21 of the television determines whether or not the present volume level is the setting condition of the control message (e.g., volume level is less than or equal to a maximum tolerable value X).

If the present setting condition does not correspond with the setting condition of the control message ("NO" in step S22 of FIG. 3), the control unit 21 of the television stores the present volume level as the user setting value (step S34).

Specifically, if the present volume level is greater than the maximum tolerable value X, the present volume level is stored as the user setting value (step S23 of FIG. 3).

Then, the control unit 21 of the television automatically adjusts the volume level so that it corresponds with the setting condition of the volume restriction control signal (step S24 of FIG. 3). Since the present volume level is greater than the setting condition of the control message, the control unit 21 of the television changes the volume level to the maximum tolerable value X, which is the setting condition of the control message closest to the present volume level (step S35).

Subsequently, when detecting a volume level changing instruction in a signal from the operation unit 24 (step S36, "YES" in step S25 of FIG. 3), the control unit 21 of the television repeatedly executes the processes of steps S21 to S24 of FIG. 3 if the volume restriction control signal is received and the volume level is greater than the maximum tolerable value. Thus, as shown in FIG. 4, the control unit 21 of the television stores the changed volume level as the user setting value (step S37, step S23 of FIG. 3). In this case, the control unit 21 of the television maintains the volume level, which has been instructed to be changed, at the maximum tolerable value X that corresponds to the setting condition of the control message.

Thereafter, when the call is completed, the control unit 11 of the home telephone detects the completion of the incoming call with the incoming call detection means (step S41) and stops transmission of the volume restriction control signal (step S42). In this case ("YES" in step S26 of FIG. 3), the control unit 21 of the television detects the completion of the receipt of the volume restriction control signal (step S43) and changes the volume level back to the volume level stored as the user setting value (step S44, step S27 of FIG. 3).

The present example has the advantages described below in addition to advantages (1) to (4).

In the present example, when detecting the incoming call (step S31), the home telephone transmits the volume restriction control signal (step S32). When the present volume level does not correspond to the setting condition of the control message in the volume restriction control signal, the control unit 21 of the television, which receives the volume restriction control signal, changes the volume level so that it corresponds to the setting condition of the control message (step S35). Thus, if an incoming call is received by the home telephone, the television that is located nearby is controlled so that the volume is automatically lowered.

In the present example, when detecting a volume level changing instruction in the signal from the operation unit 24 (step S36), the control unit 21 of the television performs the processes of steps S21 to S24 if the volume restriction control signal is received and the volume level is greater than the maximum tolerable value X. Thus, the control unit 21 of the television stores the changed volume level as the user setting value (step S37) and the setting condition of the control message is maintained. Accordingly, even if an operation is performed with the operation unit 24, priority is given to the control executed by the home telephone. Thus, the volume of the television remains low.

In the present example, when the volume restriction control signal is received (step S33) or the setting condition is manually changed and the volume restriction control signal is received (step S36), the process for storing the user setting value is executed (steps S34, S37). When completion of an incoming call is detected (step S41), the control unit 11 of the home telephone stops the transmission of the volume restriction control signal (step S42). In this case, the control unit 21 of the television detects completion of the receipt of the volume restriction control signal (step S43) and changes the volume level to the user setting value. Thus, when the detection of the incoming call signal is completed, the volume of the television is automatically returned to the volume level set by the user. This provides user convenience.

Figure 5:
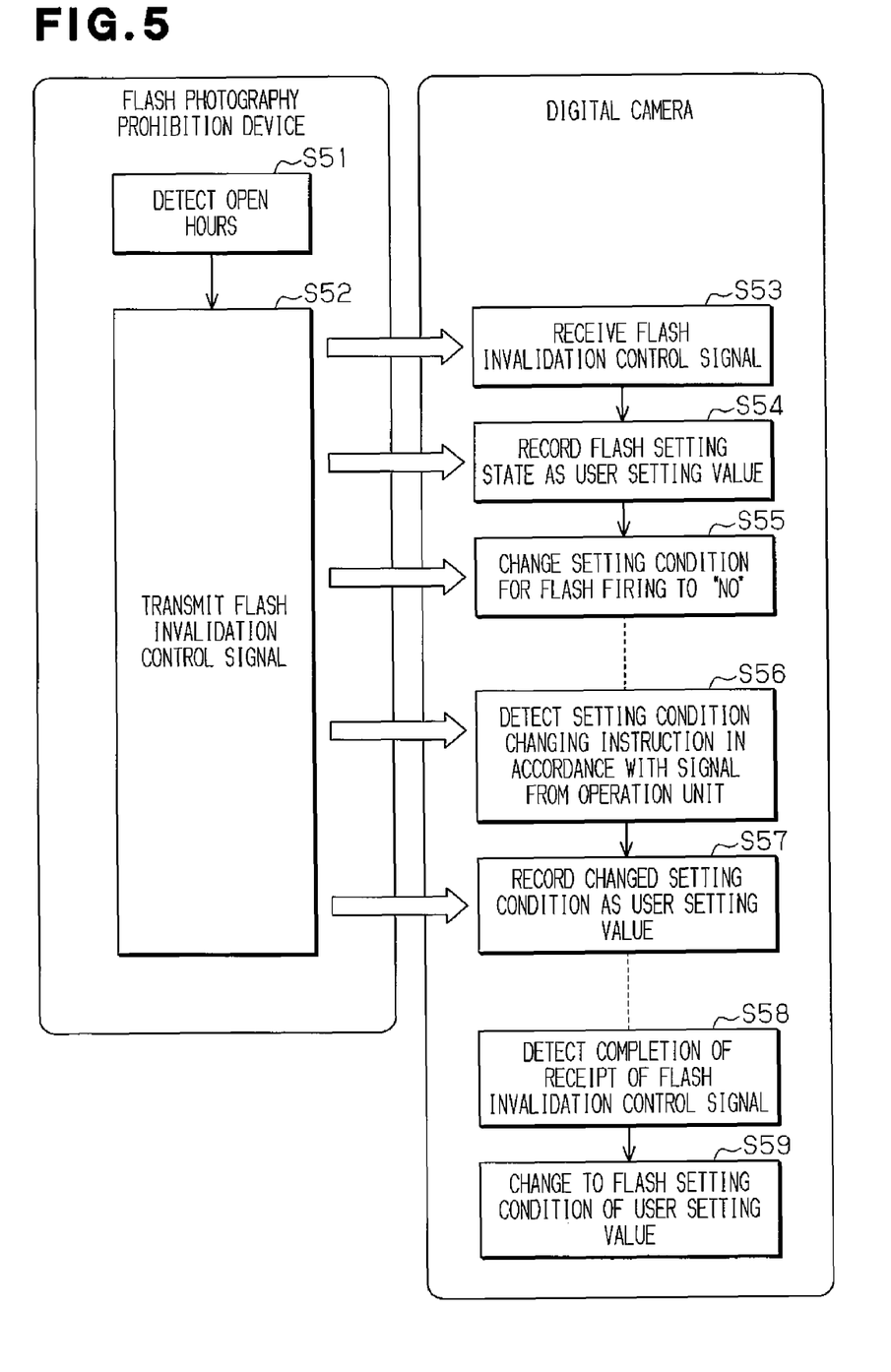
FIG. 5 is a flowchart showing the main parts of the process in a second example in accordance with the present invention.

A second example in which control is executed to prohibit a digital camera from performing flash photography, for example in art galleries and museums, will now be discussed with reference to FIG. 5. Here, a flash photography prohibition device functions as the controller 10, and the digital camera functions as the electronic device 20.

The flash photography prohibition device is arranged near displayed paintings and exhibits. The flash photography prohibition device transmits a flash invalidation control signal serving as the function control signal. In the flash photography prohibition device, a time detection means for detecting open hours functions as the trigger signal providing unit 12. The memory 13 of the flash photography prohibition device stores function type specification data for specifying a photography function and a control message of the setting condition for photography (flash firing prohibition).

The control subject 25 of the digital camera is a photography function unit. The operation unit 24 of the digital camera is a button for setting the photography condition. The function changing means of the control unit 21 of the digital camera holds the present setting condition of the photography function (flag of "YES" or "NO" indicating flash firing setting). When receiving the flash invalidation control signal, the control unit 21 specifies the photography function from the function type specification in the flash invalidation control signal. Then, the control unit 21 executes the processes of steps S21 to S27, which are described above, to control the setting condition of the photography function (setting condition of "NO" flash firing).

A process for controlling flash photography prohibition of the digital camera with the flash photography prohibition device will now be discussed.

The control unit 11 of the flash photography prohibition device detects the open hours (step S51). Specifically, when detecting the open hours, the time detection means of the flash photography prohibition device provides the trigger signal to the control unit 11 (step S11 of FIG. 2).

The control unit 11 of the flash photography prohibition device then executes a process for transmitting the flash invalidation control signal (step S52). Specifically, the remote control processing means of the control unit 11 acquires the function type specification data and the control message stored in the memory 13, generates the flash invalidation control signal, and transmits the flash invalidation control signal out of the controller 10 with the wireless communication unit 14 (step S12 of FIG. 2).

In this case, the digital camera when located in the control target area receives the flash invalidation control signal (step S53, step S13 of FIG. 2, "YES" in step S21 of FIG. 3). The control unit 21 of the digital camera then specifies the photography function as the control target from the function type specification in the flash invalidation control signal. The control unit 21 also specifies the present setting condition of the photography function.

The control unit 21 of the digital camera then determines whether or not the present setting condition corresponds with the setting condition in the flash invalidation control signal (step S22 of FIG. 3). Specifically, the control unit 21 determines whether or not the setting condition for the photography function of the digital camera is "NO" flash firing.

If the present setting condition does not correspond with the setting condition of the control message ("NO" in step S22 of FIG. 3), the control unit 21 of the digital camera stores the present setting condition as the user setting value (step S54). Specifically, if the flash firing setting condition is presently "YES", the flag indicating the flash firing setting condition of "YES" is stored as the user setting value (step S23 of FIG. 3).

The control unit 21 of the digital camera then changes the setting condition so that it corresponds to the setting condition of the photography function (step S24 of FIG. 3). Specifically, the control unit 21 of the digital camera changes the flash firing setting condition to "NO" (step S55).

Subsequently, when detecting a changing instruction in a signal from the operation unit 24 (step S56, "YES" in step S25 of FIG. 3), if the flash invalidation control signal is received and the changing instruction is for setting the flash firing to "YES", the control unit 21 of the digital camera repeatedly executes the processes of steps S21 to S24. Thus, the control unit 21 stores the flag indicating the flash firing setting condition of "YES" as the user setting value (step S57, step S23 of FIG. 3), and the flash firing setting condition of "NO", which is the setting condition of the control message, is maintained.

Thereafter, when the digital camera is moved outside the control target area of the flash invalidation control signal, the control unit 21 of the digital camera detects completion of the receipt of the flash invalidation control signal (step S58). In this case ("YES" in step S26 of FIG. 3), the control unit 21 of the digital camera changes the flash firing setting condition to "YES" (step S59, step S27 of FIG. 3) if the flag indicating the flash firing setting condition of "YES" is stored as the user setting value. If the flag indicating the flash firing setting condition of "NO" is stored as the user setting value, the flash firing setting condition of "NO" is maintained.

The present example has the advantages described below in addition to advantages (1), (3), and (4).

In the present example, when detecting the open hours (step S51), the flash photography prohibition device transmits the flash invalidation control signal (step S52). If the present setting condition does not correspond with the setting condition of the control message (step S55), the control unit 21 of the digital camera that receives the flash invalidation control signal changes the flash firing setting condition to "NO", which is the setting condition of the control message. Thus, in the control target area, the flash photography prohibition device inhibits photography using the flash firing photography function of the digital camera.

In the present example, when detecting a changing instruction for changing the flash firing setting condition to "YES" in the signal from the operation unit 24 (step S56) and the flash invalidation control signal is received, the processes of steps S21 to S24 are performed. Thus, the control unit 21 stores the flag indicating the flash firing setting condition of "YES" as the user setting value (step S57), and the setting condition of the control message is maintained. Accordingly, even if an operation is performed with the operation unit 24, priority is given to the control executed with the flash invalidation control signal. Thus, the digital camera when located in the control target area, is inhibited from performing flash photography.

In the present example, when the digital camera is moved outside the control target area, the control unit 21 of the digital camera detects the completion of the receipt of the flash invalidation control signal (step S58). In this case, if the flag indicating the flash firing setting condition of "YES" is stored as the user setting value, the control unit 21 of the digital camera changes the flash firing setting condition to "YES" (step S59). Thus, when the digital camera is located in an area other than the control target area, the setting condition is automatically returned to the setting condition of the photography function set by the user. Accordingly, the user who could not take photographs in a flash firing photography prohibition area will be able to take photographs with the setting conditions that were set by the user before the prohibition of flash photography and automatically maintained during the prohibition.

A third example in which a control is executed to reduce the volume of car audio equipment in an automobile located near an emergency vehicle (ambulance, fire engine, police car) that is being driven under an emergency situation will be discussed with reference to FIGS. 6 and 7. In the present example, the volume of the car audio equipment in an automobile is reduced when an emergency vehicle approaches the automobile so that the driver will become aware of the approaching emergency vehicle. A volume reduction control device installed in the emergency vehicle functions as the controller 10 and the car audio equipment of the automobile functions as the electronic device 20.

Figure 6:
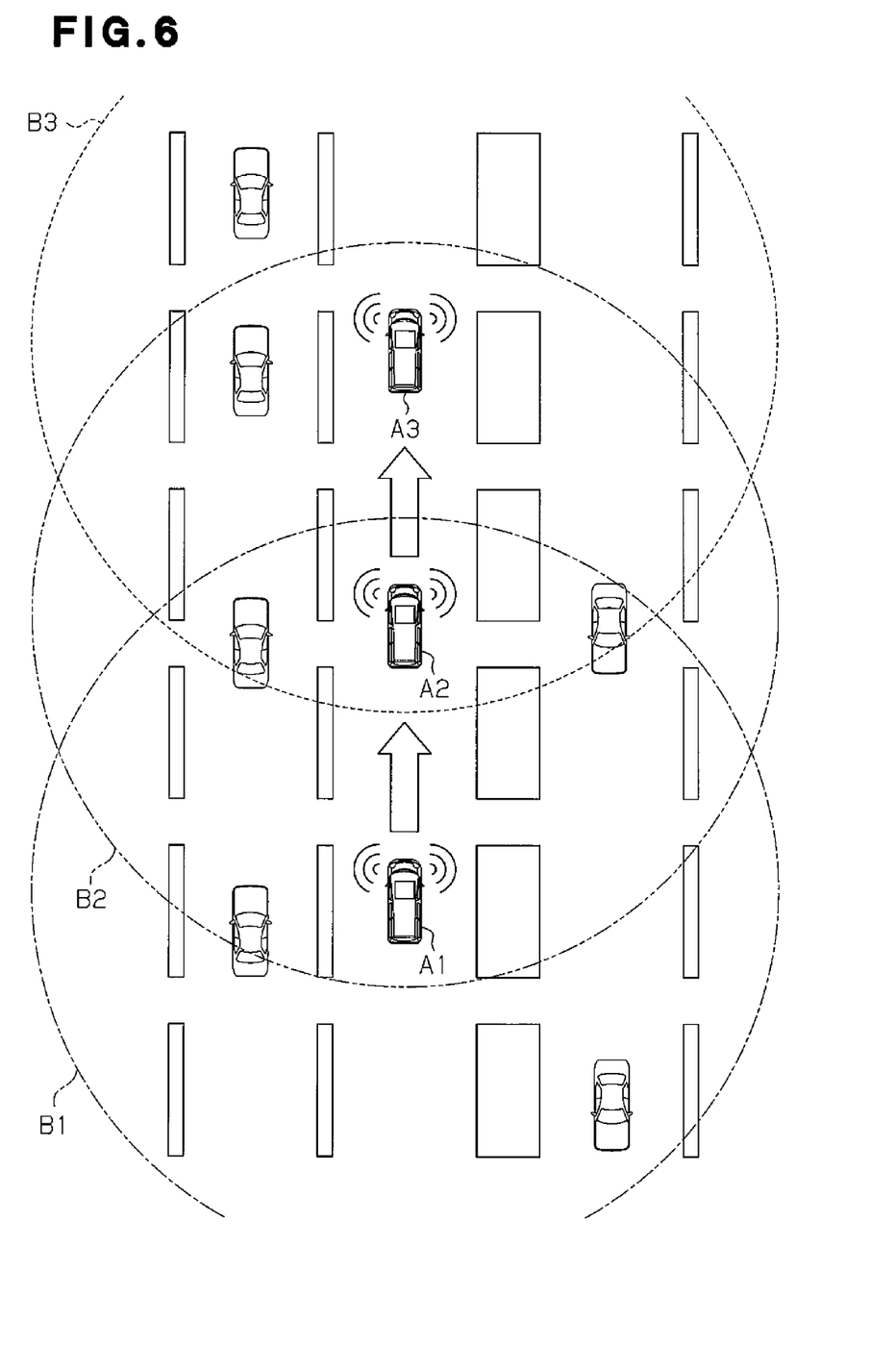
FIG. 6 is an explanatory diagram showing application of a third example in accordance with the present invention.
Figure 7:
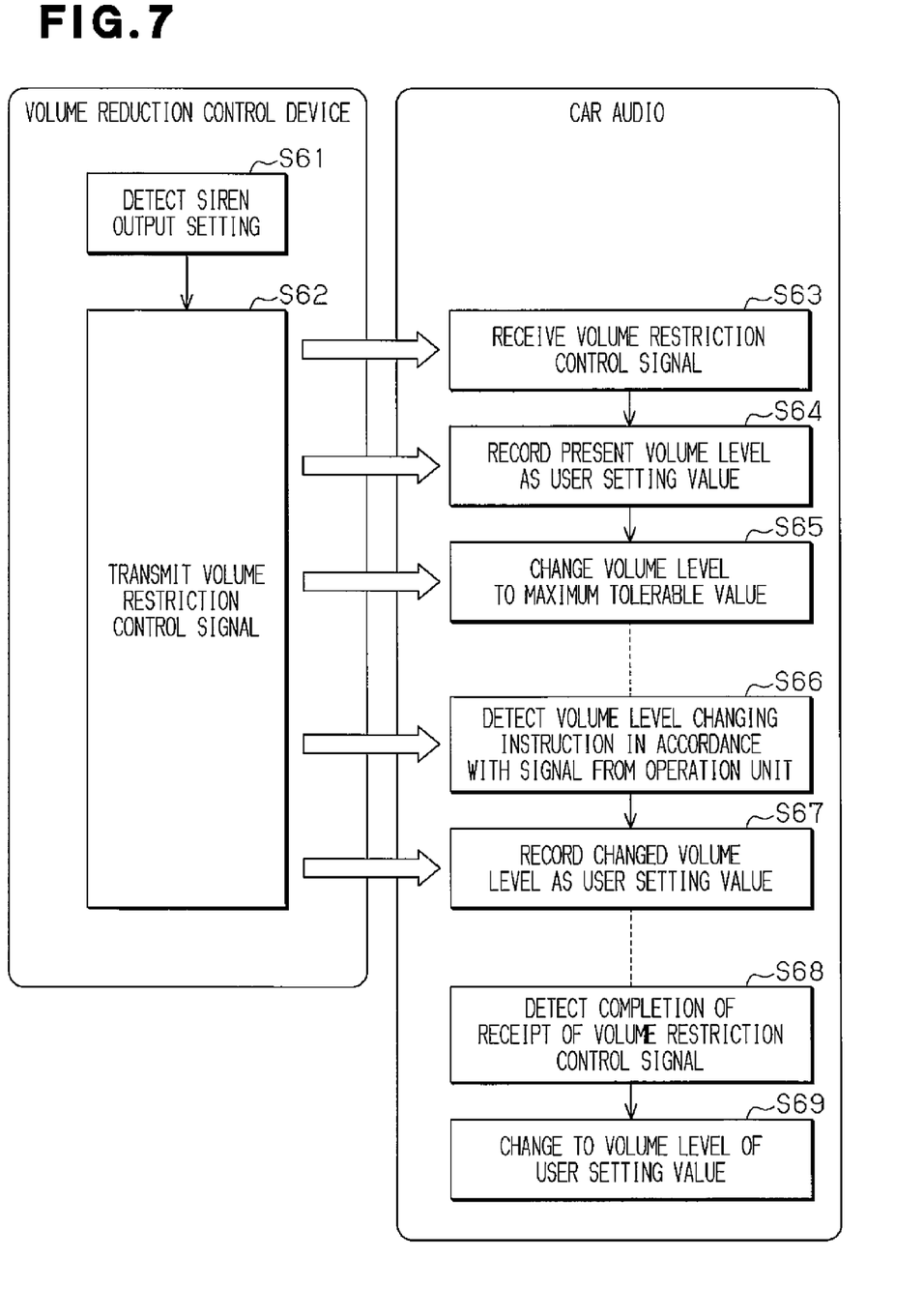
FIG. 7 is a flowchart showing the main parts of the process in the third example.

In the present example, referring to FIG. 6, the location of the control target area moves as the emergency vehicle travels. Specifically, as the emergency vehicle moves to positions A1, A2, and A3, the control target area moves to areas B1, B2, and B3. This switches the car audio equipment controlled by the volume reduction control device.

The volume reduction control device transmits a volume restriction control signal serving as the function control signal. In the volume reduction control device, a siren output setting unit for detecting the output setting of a siren functions as the trigger signal providing unit 12. The memory 13 of the volume reduction control device stores the function type specification data, which specifies a sound output function, and the control message, which indicates the setting condition (volume level) for sound. The setting condition for the volume of the car audio equipment (e.g., volume level is less than or equal to maximum tolerable value Y) is used as the sound setting condition when the emergency vehicle is traveling.

The control subject 25 of the car audio equipment is a sound output unit for outputting the sound of the audio. The operation unit 24 of the car audio is a volume adjustment unit for adjusting the volume. The function changing means of the control unit 21 for the car audio equipment stores the present setting condition (volume level) of the sound output function. Upon receipt of the volume restriction control signal, the control unit 21 specifies the sound output function as the control target from the function type specification in the volume restriction control signal. Then, the control unit 21 executes the processes of steps S21 to S27, which are described above, to control sound (volume control).

The process of controlling the volume of the car audio equipment with the volume reduction control device will now be discussed with reference to FIG. 7.

The control unit 11 of the volume reduction control device detects the siren output setting (step S61). Specifically, when the emergency vehicle is traveling under an emergency situation and the siren is on, the siren output setting unit of the volume reduction control device provides the control unit 11 with a trigger signal indicating that the siren is on (step S11 of FIG. 2).

In this case, the control unit 11 of the volume reduction control device executes a process for transmitting the volume restriction control signal (step S62). Specifically, the remote control processing means of the control unit 11 acquires the function type specification data and the control message stored in the memory 13, generates the volume restriction control signal, and transmits the volume restriction control signal out of the controller 10 with the wireless communication unit 14 (step S12 of FIG. 2).

The car audio equipment located in the control target area receives the volume restriction control signal (step S63, step S13 of FIG. 2, "YES" in step S21 of FIG. 3). The control unit 21 of the car audio specifies the sound output function as the function that is controlled from the function type specification in the volume restriction control signal. The control unit 21 also specifies the present setting condition (volume level) of the sound output function.

The control unit 21 of the car audio determines whether or not the present setting condition corresponds with the setting condition of the sound in the volume restriction control signal (step S22 of FIG. 3). Specifically, the control unit 21 of the car audio determines whether or not the present volume level corresponds to the setting condition of the control message (volume level is less than or equal to maximum tolerable value Y).

If the present setting condition does not correspond with the setting condition of the control message ("NO" in step S22 of FIG. 3), the control unit 21 of the car audio equipment stores the present volume level as the user setting value (step S64). Specifically, if the present volume level is greater than the maximum tolerable value Y, the present volume level is stored as the user setting value (step S23 of FIG. 3).

The control unit 21 of the car audio equipment adjusts the volume level so that it corresponds to the setting condition of the volume restriction control signal. Since the present volume level is greater than the setting condition of the control message, the control unit 21 of the car audio equipment changes the volume level to the maximum tolerable value Y, which is the setting condition of the control message closest to the present volume level (step S65, step S24 of FIG. 3).

Subsequently, when detecting a volume level changing instruction in a signal from the operation unit 24 (step S66, "YES" in step S25 of FIG. 3), if the volume restriction control signal is received and the volume level is greater than the maximum tolerable value, the control unit 21 of the car audio equipment repeatedly executes the processes of steps S21 to S24 of FIG. 3. Thus, as shown in FIG. 7, the control unit 21 of the car audio equipment stores the changed volume level as the user setting value (step S67, step S23 of FIG. 3). In this case, the control unit 21 of the car audio equipment maintains the volume level, which has been instructed to be changed, at the maximum tolerable value Y in correspondence with the setting condition of the control message.

Thereafter, when the car audio equipment is moved out of the control target area, which depends on the relative distance of the automobile from the emergency vehicle, the control unit 21 of the car audio equipment detects the completion of the receipt of the volume restriction control signal (step S68). In this case ("YES" in step S26 of FIG. 3), the control unit 21 of the car audio equipment changes the volume level back to the volume level stored as the user setting value (step S69, step S27 of FIG. 3).

The present example has the advantages described below in addition to advantages (1) to (4).

In the present example, when detecting the siren output setting (step S61), the volume reduction control device installed in the emergency vehicle transmits the volume restriction control signal (step S62). The control unit 21 of the car audio equipment receives the volume restriction control signal, changes the volume level so that it corresponds to the setting condition of the control message if the present volume level does not correspond with the setting condition of the control message in the volume restriction control signal (step S65). Accordingly, the volume of the car audio equipment in an automobile located near the traveling emergency vehicle is controlled by the volume reduction control device. This allows the driver to become aware of the approaching emergency vehicle.

In the present example, when detecting the volume level changing instruction in a signal from the operation unit 24 (step S66), if the volume restriction control signal is received and the volume level is greater than the maximum tolerable value Y, the control unit 21 of the car audio equipment performs the processes of steps S21 to S24. Thus, the control unit 21 of the car audio equipment stores the changed volume level as the user setting value (step S67), and the setting condition of the control message is maintained. Accordingly, even if an operation is performed with the operation unit 24, priority is given to the control executed by the volume reduction control device. Thus, the volume of the car audio equipment remains small as the emergency vehicle passes nearby.

In the present example, when the control unit 21 of the car audio equipment no longer receives the volume restriction control signal for example because the emergency vehicle has passed by, it returns the volume level back to the user setting value (step S69). Thus, after the emergency vehicle passes by, the volume of the car audio equipment is automatically returned to the volume level set by the user. This provides user convenience.

A fourth example in which a control is executed to restrict the brightness of a game device having a wireless communication function when the game device is, for example, being used on a crowded train will be discussed with reference to FIG. 8. A brightness restriction control means functions as the controller 10, and the game device functions as the electronic device 20.

The brightness restriction control means is installed, for example, in the car of a crowded train. The brightness restriction control means transmits a brightness restriction control signal serving as the function control signal when the train is crowded. In the present embodiment, the crowded situation may be specified by a time period, for example, at peak travel times. Thus, in the brightness restriction control means, a time detection means for detecting whether or not the present time is the crowded time period, functions as the trigger signal providing unit 12. The memory 13 of the brightness restriction control means stores the function type specification data, which specifies a display function, and the control message, which indicates the setting condition (brightness level) for a display. The setting condition of the brightness level is a brightness level that would not be bright to other passengers in a crowded car (brightness level is less than or equal to a maximum tolerable level Z).

The control subject 25 of the game device is the display. The operation unit 24 of the game device is a brightness adjustment unit for adjusting the brightness of the display. The function changing means of the control unit 21 of the game device stores the present setting condition (brightness level) of the display function. When receiving the brightness restriction control signal, the control unit 21 specifies the display function as the control target from the function type specification in the brightness restriction control signal. Then, the control unit 21 executes the processes of steps S21 to S27 to control the brightness of the display function.

The process of controlling the brightness restriction of the game device with the brightness restriction control means will now be discussed.

Figure 8:
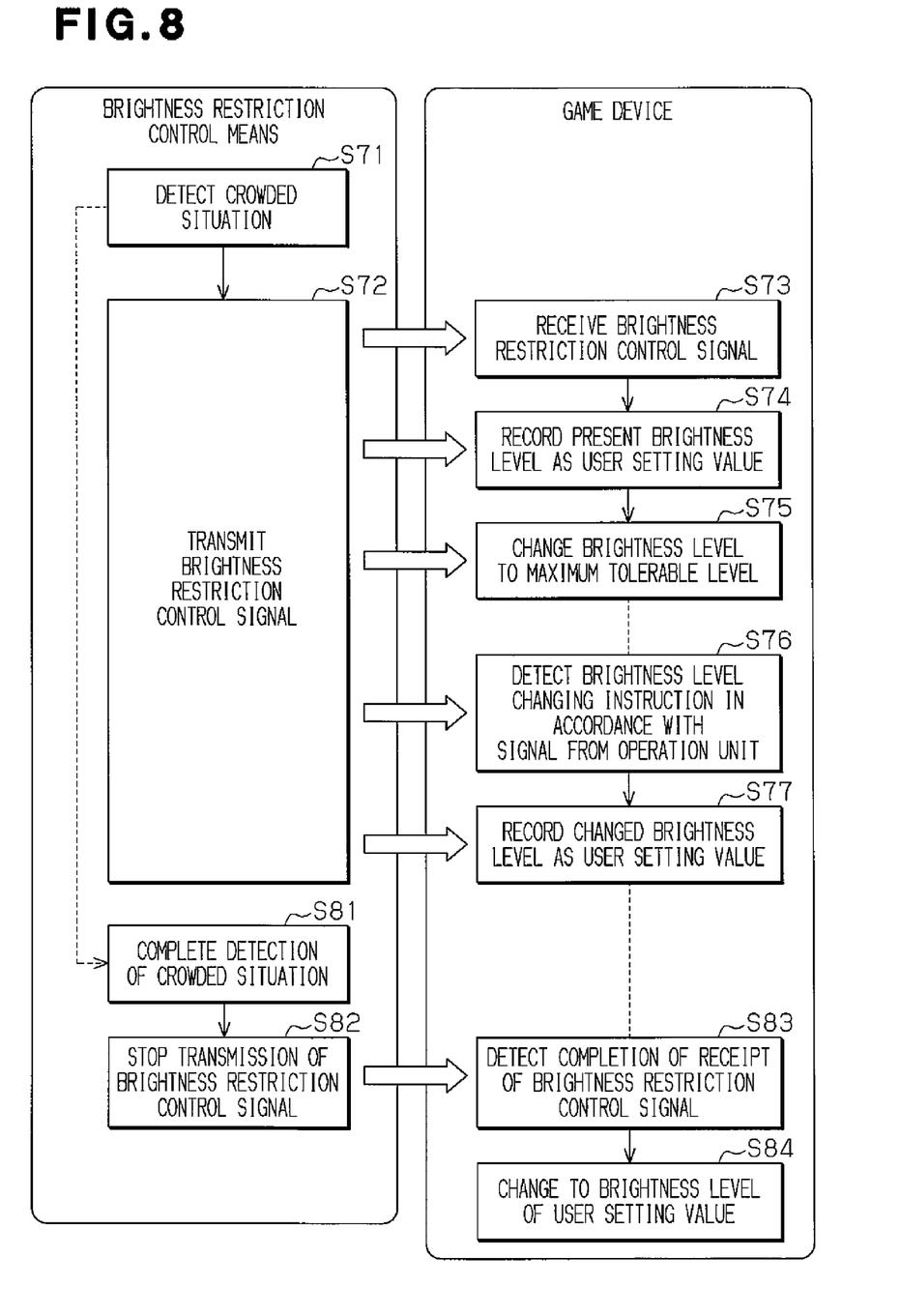
FIG. 8 is a flowchart showing the main parts of the process in a fourth example in accordance with the present invention.

As shown in FIG. 8, the control unit 11 of the brightness restriction control means executes a process for detecting a crowded situation (step S71). Specifically, the time detection means of the brightness restriction control means detects the crowded time period and provides a trigger signal to the control unit 11 (step S11 of FIG. 2).

The control unit 11 of the brightness restriction control device then executes a process for transmitting the brightness restriction control signal (step S72). Specifically, the remote control processing means of the control unit 11 acquires the function type specification and the control message stored in the memory 13, generates the brightness restriction control signal, and transmits the brightness restriction control signal out of the controller 10 with the wireless communication unit 14 (step S12 of FIG. 2).

In this case, the game device when located in the control target area receives the brightness restriction control signal (step S73, step S13 of FIG. 2, "YES" in step S21 of FIG. 3). The control unit 21 of the game device specifies the display function as the control target from the function type specification in the brightness restriction control signal. The control unit 21 also specifies the present setting condition (brightness level) of the display function.

The control unit 21 of the game device then determines whether or not the present setting condition corresponds with the setting condition of the brightness in the brightness restriction control signal (step S22 of FIG. 3). Specifically, the control unit 21 of the game device determines whether or not the setting condition corresponds to the setting condition of the control message (brightness level is less than or equal to maximum tolerable level Z).

If the present brightness setting condition does not correspond with the setting condition of the control message ("NO" in step S22 of FIG. 3), the control unit 21 of the game device stores the current brightness level as the user setting value (step S74). Specifically, if the current brightness level is not less than or equal to a maximum tolerable level Z, the current brightness level is stored as the user setting value (step S23 of FIG. 3).

The control unit 21 of the game device changes the brightness level so that it corresponds to the setting condition of the brightness restriction control signal. The control unit 21 of the game device changes the brightness level to the maximum tolerable level Z, which is the setting condition of the control message closest to the current brightness level (step S75, step S24 of FIG. 3). Specifically, since the current brightness level is greater than the setting condition of the control message, the control unit 21 of the television changes the brightness level to the maximum tolerable level Z, which is the setting condition of the control message closest to the current brightness level (step S75).

The control unit 21 of the game device may then detect a brightness level changing instruction in a signal from the operation unit 24. In such a case (step S76, "YES" in step S25 of FIG. 3), the changed brightness level is stored as the user setting value (step S77, step S23 of FIG. 3) if the brightness restriction control signal is received and the brightness level is greater than the maximum tolerable level.

Subsequently, when detection of a crowded situation is completed, upon detection of a completion time of the crowded time period (step S81), the control unit 11 of the brightness restriction control means stops transmitting the brightness restriction control signal (step S82). In this case, the control unit 21 of the game device detects the completion of the receipt of the brightness restriction control signal. The completion of the receipt of the brightness restriction control signal also is detected (step S83) when the game device moves away from the control target area. In this case ("YES" in step S26 of FIG. 3), the game device changes the brightness level to the brightness level stored as the user setting value (step S84, step S27 of FIG. 3).

The present example has the advantages described below in addition to advantages (1) to (4).

In the present example, when detecting a crowded situation (step S71), the brightness reduction control device installed in a train car or the like transmits the brightness restriction control signal (step S72). If the current brightness level does not correspond with the setting condition of the control message in the brightness restriction control signal, the control unit 21 of the game device changes the brightness level so that it corresponds to the setting condition of the control message (step S75). This suppresses the brightness of the game device when the train is crowded.

In the present example, when detecting a brightness level changing instruction in a signal from the operation unit 24 (step S76), if the brightness restriction control signal is received and the brightness level is greater than the maximum tolerable level, the control unit 21 of the game device executes the processes of steps S21 to S24. Thus, the control unit 21 of the game device stores the changed brightness level as the user setting value (step S77), and the setting condition of the control message is maintained. Thus, even if the operation unit 24 is operated, priority is given to the control executed by the brightness restriction control device. Thus, the brightness of the game device is suppressed when a crowded situation continues.

In the present example, upon completion of the receipt of the brightness restriction control signal, the control unit 21 of the game device returns the brightness level back to the user setting value (step S84). Thus, when the game device is moved away from the control target area, the brightness of the game device is automatically returned to the brightness level set by the user. This provides user convenience.

In the present example, the restriction control signal could also restrict the volume of the game device, as well as the brightness.

It should be apparent to those skilled in the art that the present invention may be embodied in many other specific forms without departing from the spirit or scope of the invention. Particularly, it should be understood that the present invention may be embodied in the following forms.

In the first to fourth examples, the controls executed in different applications have been described. However, the present invention is not limited to these applications.

For instance, in the second example, a motion sensor may be arranged in the control target area, and a flash invalidation control signal may be transmitted only when the motion sensor detects the presence of a person. In this case, the control unit 21 transmits the function control signal when acquiring the trigger signal (detection signal) from the sensor, which serves as the trigger signal providing unit 12.

The volume reduction control device of the third example reduces the volume of the car audio but instead may lower the volume of an automobile horn (warning sound). In this case, the volume reduction control device adjusts the volume of the horn when receiving the function control signal. Specifically, the volume is adjusted by restricting and shortening the time during which the horn produces sound.

Further, a volume reduction control device that transmits a noise reduction control signal during a predetermined time period (volume reduction period: e.g., predetermined time period during the night) may be used. In this case, the volume reduction control device is installed along a road in a noise reduction area (hospital, school zone, or residential area), and a volume restriction control signal is transmitted to the noise reducing area during the volume reduction period.

The volume reduction control signal may be transmitted in accordance with the environmental noise in the subject area. In this case, the volume reduction control device includes a sound collection unit (e.g., audio sensor). Further, the volume reduction control device stores a noise correspondence table in which a reference volume is stored in accordance with the environmental noise. The volume reduction control device measures the environmental noise with the sound collection unit and acquires the reference noise corresponding to the environmental noise from the noise correspondence table. The volume reduction control device then transmits the function control signal containing the control message for the reference noise.

Further, in the fourth example, the brightness reduction control device that restricts brightness may execute a control to restrict the brightness (brightness) of an electronic device not only during a crowded period but also in, for example, a night bus.

In one embodiment, the controller 10 controls a single function of the electronic device 20. However, the controller 10 may control more than a single function. For example, the controller 10 may control an electronic device 20 having multiple functions, such as a photography function, a sound output function, and a display function. In such a case, for the functions of the function type specification, the electronic device 20 stores the present setting conditions in association with the function type specification. When receiving the function control signal, the electronic device 20 specifies the current setting conditions of the function type specification in the signal. Then, the electronic device 20 executes a control operation so that the setting conditions correspond to the setting condition of the function message. Thus, the controller 10 controls a multiple-function electronic device 20 in the same manner as a single-function electronic device 20.

In the preferred embodiment, the volume level, the brightness level, or the like of the electronic device 20 may be adjusted so that the volume level, the brightness level, or the like is adjusted in the same manner in each electronic device 20 irrespective of type. The control message may include a common reference level (e.g., decibel or the like for volume) for each electronic device 20. The electronic device 20 stores a conversion table data of the volume level corresponding to the reference level. If the control message of the function control signal contains the common reference level, the control unit 21 of the electronic device 20 converts the reference level into the volume level of the electronic device 20 using the stored conversion table data to execute conditional control using the volume level. Thus, even if the tolerable range of the volume level adjusted by the electronic device 20 is different, the same control may be executed regardless of the type of electronic device 20.

The present examples and embodiments are to be considered as illustrative and not restrictive, and the invention is not to be limited to the details given herein, but may be modified within the scope and equivalence of the appended claims.

What is claimed is:

1. An apparatus for controlling an electronic device within a predefined area, the apparatus comprising:
    a trigger signal providing unit for generating a trigger signal based on predetermined criteria;
    a function control unit, connected to the trigger signal providing unit, wherein the function control unit receives the trigger signal from the trigger signal providing unit, and generates a function control signal in response to the trigger signal, wherein the function control signal includes a function type specification that specifies a function of a control subject in the electronic device, and a control message that specifies a setting condition for controlling the function of the control subject; and
    a wireless communication unit, connected to the function control unit, for receiving the function control signal and transmitting the function control signal to an electronic device in the predefined area,
    wherein the function control signal initiates a control program in the electronic device that causes the electronic device to compare a current setting condition of the control subject with the control setting of the function control signal, and store the current setting condition and then change the setting condition to the setting condition specified by the function control signal until the function control signal is completed, at which time the control program restores the setting condition of the control subject of the electronic device with the previously stored current setting condition, and wherein the control program in the electronic device is not accessible by a user of the electronic device.

2. The apparatus of claim 1, wherein the wireless communication unit transmits the function control signal via a short range wireless technology.

3. The apparatus of claim 2, wherein the wireless technology includes one of Bluetooth, Zigbee, and infrared transmission technology.

4. The apparatus of claim 1, wherein the function control signal instructs the electronic device to adjust a volume of an audio unit of the electronic device.

5. The apparatus of claim 1, wherein the function control signal instructs the electronic device to adjust a brightness setting of a display screen of the electronic device.

6. The apparatus of claim 1, wherein the electronic device comprises a mobile telephone.

7. The apparatus of claim 1, wherein the trigger signal providing unit generates the trigger signal based on a timer output.

8. The apparatus of claim 1, wherein the trigger signal providing unit generates the trigger signal based on detection of an incoming call signal.

9. A method for controlling an electronic device that is within a predefined area, the method comprising the steps of:
    generating a trigger signal in response to predetermined criteria;
    generating a function control signal in response to the trigger signal, wherein the function control signal includes a function type specification that specifies a function of a control subject in the electronic device, and a control message that specifies a setting condition for controlling the function of the control subject; and
    transmitting the function control signal, with a wireless transmission unit, within the predefined area,
    wherein when the function control signal is received by the electronic device, the function control signal initiates a control program in the electronic device that causes the electronic device to store a current setting condition of the function type in the electronic device specified by the function control signal to the setting condition specified by the function control signal, and restore the previously stored current setting condition upon completion of the function control signal, and wherein the control program in the electronic device is not accessible by a user of the electronic device.

10. The method for controlling an electronic device of claim 9, wherein the function control signal is transmitted via a short range wireless technology.

11. The method for controlling an electronic device of claim 10, wherein the wireless technology includes one of Bluetooth, Zigbee, and infrared transmission technology.

12. The method for controlling an electronic device apparatus of claim 9, wherein the function control signal instructs the electronic device to adjust a volume of an audio unit of the electronic device.

13. The method for controlling an electronic device of claim 9, wherein the function control signal instructs the electronic device to adjust a brightness setting of a display screen of the electronic device.

14. The method for controlling an electronic device of claim 9, wherein the electronic device comprises a mobile telephone.

15. The method for controlling an electronic device of claim 9, wherein the trigger signal is generated based on a timer output.

16. The method for controlling an electronic device of claim 9, wherein the trigger signal is generated based on detection of an incoming call signal.

* * * * *